(12) United States Patent
Kwon et al.

(10) Patent No.: US 8,997,253 B2
(45) Date of Patent: Mar. 31, 2015

(54) METHOD AND SYSTEM FOR PREVENTING BROWSER-BASED ABUSE

(75) Inventors: Oh-Hyun Kwon, Seongnam-si (KR); Hyun-Jong Kim, Seongnam-si (KR); Chang-Hwan Lee, Seongnam-si (KR)

(73) Assignee: NHN Business Platform Corporation (KR)

( * ) Notice: Subject to any disclaimer, the term of this patent is extended or adjusted under 35 U.S.C. 154(b) by 315 days.

(21) Appl. No.: 13/126,645

(22) PCT Filed: Nov. 3, 2009

(86) PCT No.: PCT/KR2009/006435
§ 371 (c)(1),
(2), (4) Date: Aug. 1, 2011

(87) PCT Pub. No.: WO2010/062063
PCT Pub. Date: Jun. 3, 2010

(65) Prior Publication Data
US 2011/0283366 A1    Nov. 17, 2011

(30) Foreign Application Priority Data
Nov. 3, 2008  (KR) .................. 10-2008-0108354

(51) Int. Cl.
*G06F 7/04* (2006.01)
*G06F 21/54* (2013.01)
*G06F 21/10* (2013.01)

(52) U.S. Cl.
CPC .............. *G06F 21/54* (2013.01); *G06F 21/10* (2013.01); *G06F 2221/2119* (2013.01)
USPC ........................................... 726/29

(58) Field of Classification Search
None
See application file for complete search history.

(56) References Cited

U.S. PATENT DOCUMENTS

| 7,975,308 | B1 * | 7/2011 | Satish et al. ............... 726/26 |
| 8,065,734 | B1 * | 11/2011 | Kennedy ................... 726/23 |
| 2003/0061309 | A1 * | 3/2003 | Brown et al. .............. 709/218 |
| 2005/0229188 | A1 * | 10/2005 | Schneider ................. 719/328 |
| 2006/0031759 | A1 * | 2/2006 | Brown et al. .............. 715/514 |
| 2006/0294176 | A1 * | 12/2006 | Machida et al. ........... 708/525 |
| 2007/0250531 | A1 * | 10/2007 | Wiggins et al. ........... 707/102 |
| 2008/0184141 | A1 * | 7/2008 | Selig .......................... 715/762 |

(Continued)

FOREIGN PATENT DOCUMENTS

JP    2005-166051    6/2005
KR    10-2006-0028463    3/2006

(Continued)

OTHER PUBLICATIONS

Provos et al. , The Ghost in the Browser Analysis of Web-based Malwate, 2007, Google Inc.*

(Continued)

*Primary Examiner* — Jason K. Gee
*Assistant Examiner* — Olanrewaju Bucknor
(74) *Attorney, Agent, or Firm* — Harness, Dickey & Pierce, P.L.C.

(57) ABSTRACT

Disclosed is a method and system of preventing browser-based abuse. The method of preventing browser-based abuse may include determining whether an access based on a browser function extension module is a malicious access for acquiring data of an Internet browser, and blocking the access based on the browser function extension module when the access is determined to be a malicious access.

42 Claims, 13 Drawing Sheets

(56) References Cited

U.S. PATENT DOCUMENTS

| | | |
|---|---|---|
| 2008/0184157 A1* | 7/2008 | Selig .............................. 715/781 |
| 2008/0184158 A1* | 7/2008 | Selig .............................. 715/781 |
| 2008/0184159 A1* | 7/2008 | Selig .............................. 715/781 |
| 2008/0184358 A1* | 7/2008 | Stamos et al. .................. 726/11 |
| 2008/0301811 A1 | 12/2008 | Jung |
| 2009/0100263 A1* | 4/2009 | Leonard ........................ 713/156 |
| 2009/0259839 A1* | 10/2009 | Jung et al. ..................... 713/155 |
| 2009/0281816 A1 | 11/2009 | Houga et al. |

FOREIGN PATENT DOCUMENTS

| | | |
|---|---|---|
| KR | 10-2006-0112849 | 11/2006 |
| KR | 10-2007-0090312 | 9/2007 |
| KR | 10-2007-0092656 | 9/2007 |

OTHER PUBLICATIONS

Yu et al., JavaScript instrumentation for browser security, 2007, DoCoMo Communications Laboratories USA Inc.*

International Search Report of PCT/KR2009/006435 issued on May 31, 2010.

Japanese Office Action dated Jan. 7, 2014 in corresponding Application No. 2011-534404.

* cited by examiner

METHOD AND SYSTEM FOR PREVENTING BROWSER-BASED ABUSE

CROSS-REFERENCE TO RELATED APPLICATIONS

This application is the National Stage Entry of International Application PCT/KR2009/006435, filed on Nov. 3, 2009, and claims priority from and the benefit of Korean Patent Application No. 10-2008-0108354, filed on Nov. 3, 2008, both of which are incorporated herein by reference for all purposes as if fully set forth herein.

BACKGROUND

1. Field of the Invention

The present invention relates to a method and system for preventing browser-based abuse.

2. Discussion of the Background

An Internet browser may be used with a browser function extension module, to increase the convenience of a user during web surfing. An extension module may be connected to a browser, to obtain data and/or control operations of the Internet browser. Consequently, an extension module may be used maliciously for computer hacking, data theft, and the like.

Unauthorized extension modules have become more varied and are continuously increasing in number. For example, unauthorized extension modules have been identified that manipulate a real time search word, a related search word, a site retrieval result, and the like, such that a fake keyword may be transmitted to search and portal sites, via the browser function extension module (which may be referred to as retrieval abuse). In some cases, a popup window may be added or an original webpage description may be changed and replaced, due to a browser function extension module performing an input value interception (which may be referred to as advertisement abuse). A false click may be transmitted to search and portal sites (which may be referred to as click abuse). A cookie value used by a browser function extension module of webpage may be falsified (which may be referred to as cookie abuse).

Accordingly, there is a need to prevent the unauthorized use of browser function extension modules.

SUMMARY

An aspect of the present invention provides a method and system to prevent the operation of unauthorized browser function extension modules.

An aspect of the present invention provides a method and system to prevent unauthorized browser function extension modules from acquiring a document through a browser object, by intercepting a function for acquiring the document.

An aspect of the present invention provides a method and system to prevent an unauthorized browser function extension module from acquiring a component of a document through a browser object, by intercepting a function for acquiring the component of the document.

An aspect of the present invention provides a method and system to prevent the acquisition of a document through a window message, by intercepting a window procedure function for processing the window message.

An aspect of the present invention provides a method and system to block the connection of an unauthorized browser extension module to the Internet browser.

Additional features of the invention will be set forth in the description which follows, and in part will be apparent from the description, or may be learned by practice of the invention.

According to an aspect of the present invention, there is provided a method of preventing browser-based abuse, the method including determining whether a browser function extension module requests an unauthorized access for acquiring data of an Internet browser, and blocking the unauthorized access.

The determining may include substituting a new function for an original function capable of acquiring data of the Internet browser, checking an object requesting the new function through the browser function extension module, and determining whether the object requesting the new function is authorized.

The substituting may include acquiring address information of functions associated with a browser object of the Internet browser, storing and backing up an address of the original function corresponding to a position of the original function, declaring the new function having the same format as the original function, and recording an address of the declared new function at the position of the original function.

The substituting may include determining a main window of the Internet browser, determining a view window of the Internet browser based on the main window, and substituting a new window procedure function for an original window procedure function of the view window, while processing a message delivered to the Internet browser.

The determining whether the access is an unauthorized access for acquiring data of the Internet browser may include extracting at least one connection point associated with an operation of the Internet browser, through a browser object of the Internet browser, checking a browser function extension module connected to each extracted connection point, and determining whether the checked browser function extension module is authorized.

According to an aspect of the present invention, there is provided a system of preventing browser-based abuse, the system including an abuse determining unit to determine whether an access based on a browser function extension module is an unauthorized access for acquiring data of an Internet browser, and an abuse blocking unit to block the access based on the browser function extension module, when the access is determined to be an unauthorized access.

According to the present invention, it is possible to provide a method and system for preventing browser-based abuse to prevent abuse through a browser function extension module.

According to the present invention, it is possible to prevent an unauthorized browser function extension module from acquiring a document of a browser object, by intercepting a function for acquiring the document.

According to the present invention, it is possible to prevent an unauthorized browser function extension module from acquiring a component of a document of a browser object, by intercepting a function for acquiring the component of the document.

According to the present invention, it is possible to prevent the acquisition of a document through a window message, by intercepting a window procedure function for processing the window message.

According to the present invention, it is possible to block a connection of an unauthorized browser function extension modules to the Internet browser.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
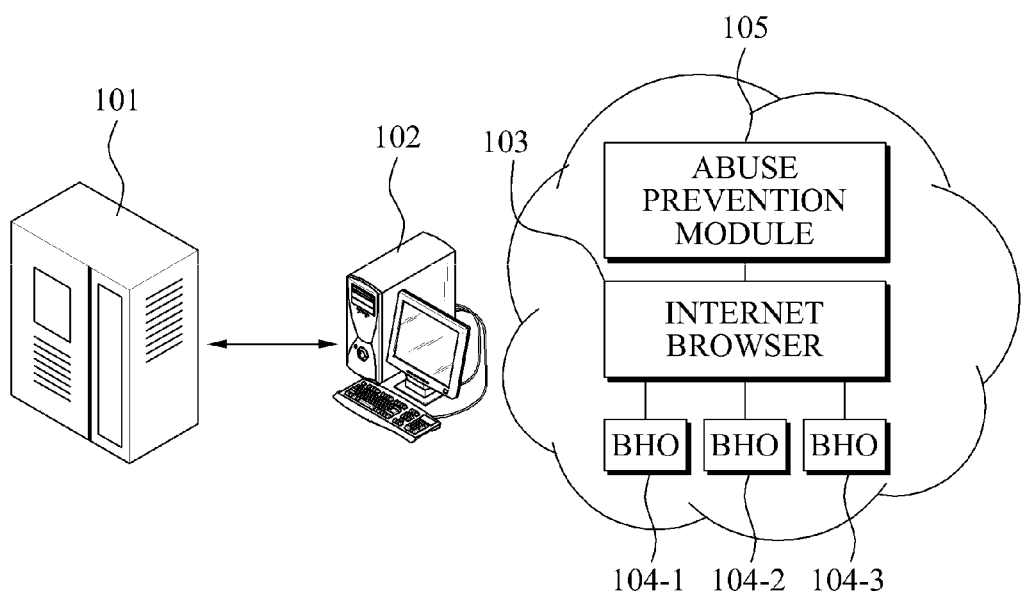
FIG. 1 is a diagram illustrating an overall operation with respect to a method of preventing browser-based abuse, according to an embodiment of the present invention.
Figure 1:
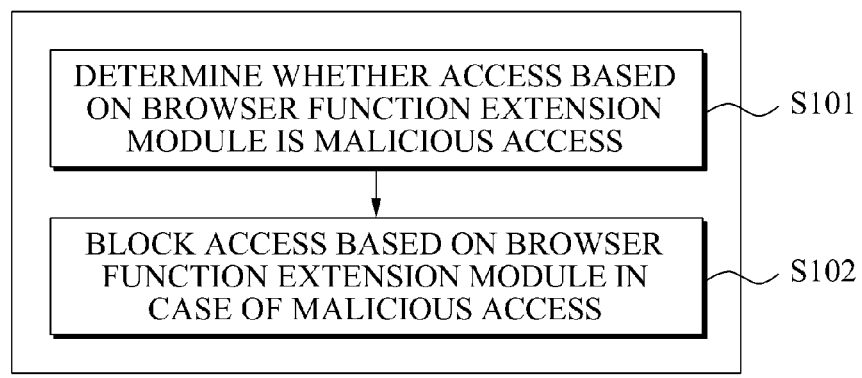

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1A illustrates a system in which a method of preventing browser-based abuse is performed, according to an exemplary embodiment of the present invention. FIG. 1B illustrates an overview of the method, according to an exemplary embodiment of the present invention.

Referring to FIG. 1A, Internet browsing may be implemented using a web server 101 and a client terminal 102. Here, an Internet browser 103 stored on the terminal 102 may be used to access the web server 102, to provide information to the terminal 102. For example, the terminal 102 may request information from the server 101, and the server 101 may retrieve the requested information, which is then delivered to the terminal 102. In this instance, the information delivered by the server 101 may be provided to a user through the Internet browser 103.

In this instance, a browser function extension module (extension module) may be used to provide an additional functionality to the Internet browser 103. Here, the browser function extension module may correspond to a program connected to the Internet browser 103 as an add-on and loaded in a memory. For example, when the Internet browser 103 corresponds to Internet Explorer, the browser function extension module may correspond to a browser helper object (BHO). When the Internet browser 103 operates, the Internet browser 103 may load connected browser function extension modules 104-1, 104-2, and 104-3 in a memory. In this instance, the browser function extension modules 104-1, 104-2, and 104-3 may be loaded in the same memory as the Internet browser 103. The browser function extension module may be applied to another Internet browser.

For example, when the Internet browser 103 corresponds to Internet Explorer, the browser function extension module may receive an IWebBrowser2 corresponding to an object indicating Internet Explorer to the Internet browser 103. The browser function extension modules 104-1, 104-2, and 104-3 may detect a typical operation of the Internet browser 103 through IWebBrowser2 and may monitor messages occurring in the browser. The browser function extension modules 104-1, 104-2, and 104-3 may be connected to the Internet browser 103 and control the Internet browser 103. However, browser function extension modules may be developed for an unauthorized purpose, and thus, various types of abuse may occur due to an unauthorized extension module.

An abuse prevention module 105, according to an embodiment of the present invention, may be connected to the Internet browser 103 as an add-on type program similar to the browser function extension modules 104-1, 104-2, and 104-3. Here, the abuse prevention module 105 may block the operation of an unauthorized browser function extension module.

The abuse prevention module 105 may block abuse of the browser function extension modules 104-1, 104-2, and 104-3, according to the method shown in FIG. 1B. Referring to FIG. 1B, in operation S101, the abuse prevention module 105 may determine whether an access based on a browser function extension module is an unauthorized access, such as an access designed for acquiring data of the Internet browser 103. For example, the access based on a browser function extension module may include an access of the browser function extension module desiring to control the Internet browser while being connected to the Internet browser. The access based on a browser function extension module may include the browser function extension module attempting to acquire data of the Internet browser, through a functional call or a delivery of a message. The access based on a browser function extension module may is not limited to the above.

In operation S102, the abuse prevention module 105 may block the access based on a browser function extension module, when the access based on a browser function extension module is determined to be an unauthorized access. The abuse prevention module 105 may block a connection of an unauthorized browser function extension module to the Internet browser, or may block the acquisition of data from the Internet browser.

Methods of preventing the operation of various types of unauthorized browser function extension modules will be described with reference to FIG. 2 through FIG. 9. For example, a method of preventing browser-based abuse, according to an embodiment of the present invention, may be implemented by an abuse prevention module.

Here, the abuse prevention module may also correspond to a browser function extension module. That is, the abuse prevention module may block the operation of an unauthorized browser function extension module connected to the Internet browser.

Figure 2:
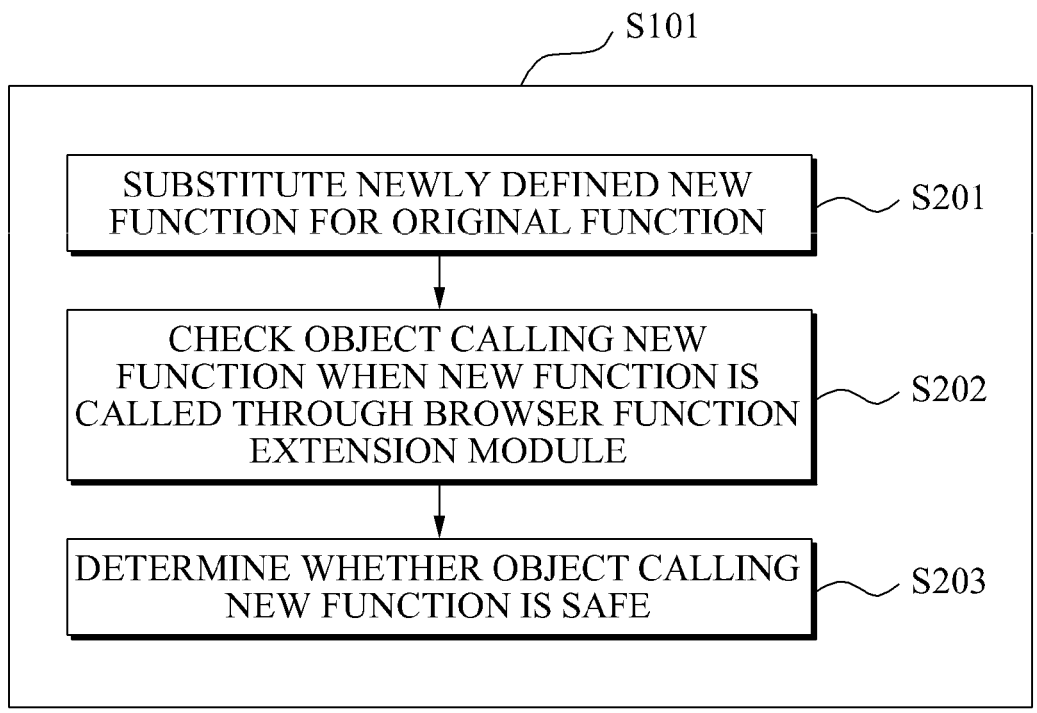
FIG. 2 is a flowchart illustrating an operation of determining whether an access by a browser function extension module is an unauthorized access, through a substitution of a function, according to an embodiment of the present invention.

FIG. 2 is a flowchart illustrating an operation of determining whether an access by a browser function extension module is an unauthorized access, through the substitution of a function, according to an embodiment of the present invention. In particular, FIG. 2 describes a scheme of preventing an unauthorized browser function extension module from requesting an original function capable of acquiring data of an Internet browser, by intercepting the original function. Here, the original function may include a function capable of acquiring a document through the Internet browser, or a function capable of acquiring a component of the document. The original function may correspond to a function to acquire a Hyper Text Markup Language (HTML) object using the Internet browser.

Referring to FIG. 2, operation S101 includes operation S201, operation S202, and operation S203. In operation S201, an abuse prevention module may substitute a new function for an original function capable of acquiring data of the Internet browser. Here, the abuse prevention module may substitute a hook function for the original function. The hook function may have the same format as the original function.

In other words, the abuse prevention module may prevent execution of the original function by the unauthorized browser function extension module, by intercepting the original function before it is executed. Even though the browser function extension module attempts to call the original function, the hook function is substituted for the original function by the abuse prevention module. Further operations of substituting a hook function for the original function will be described with reference FIG. 3 and FIG. 5.

In operation S202, when the new function is requested by the browser function extension module, the abuse prevention module may check an object requesting the new function. As an example, when the browser function extension module requests the new function, the abuse prevention module may determine the type of browser function extension module that requests the new function. For example, the browser function extension module may check the browser function extension module by determining an address where the new function is to return.

In operation S201, the abuse prevention module may determine whether the object calling the new function is authorized. For example, the abuse prevention module may determine whether the browser function extension module is authorized, using a list of normal browser function extension modules used in the Internet browser. If the browser function extension module is included in the list of normal browser function extension modules used in the Internet browser, the abuse prevention module may determine the browser function extension module is an authorized module.

Figure 3:
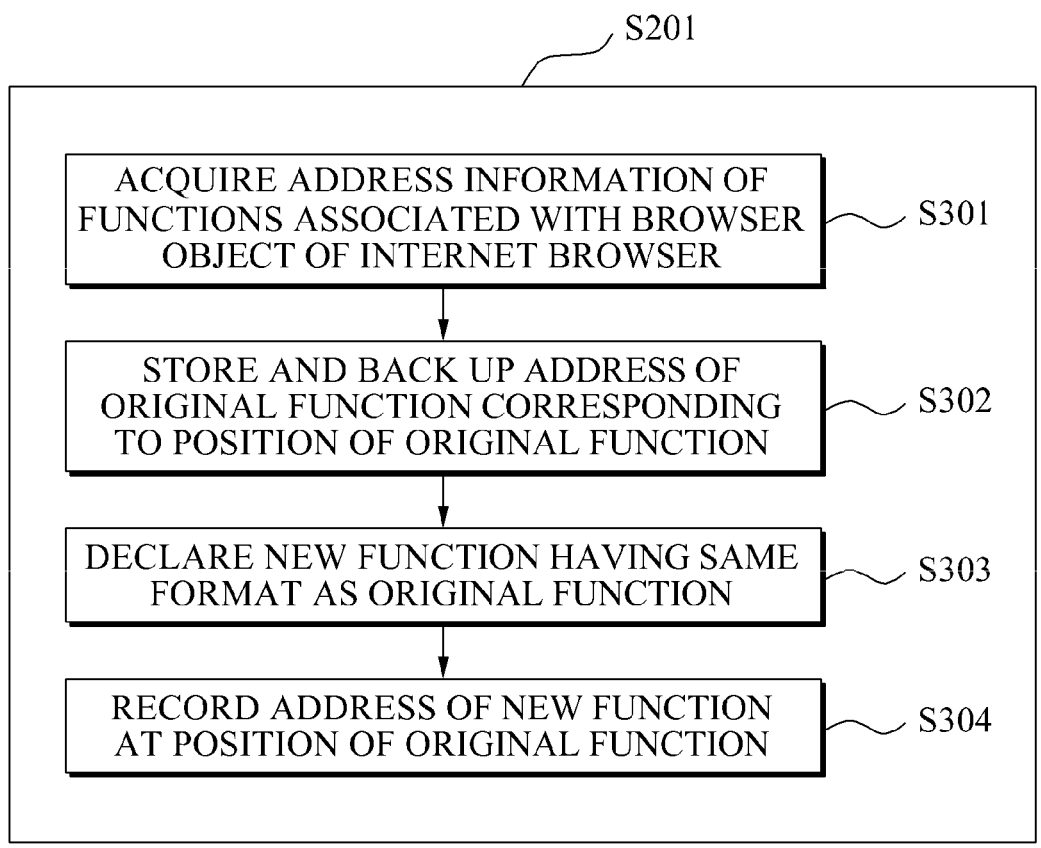
FIG. 3 is a flowchart illustrating an operation of substituting a function for acquiring a document and/or a component of the document, according to an embodiment of the present invention.

FIG. 3 is a flowchart illustrating an operation of substituting a function for acquiring a document and a component of the document according to an embodiment of the present invention. FIG. 3 describes an operation of preventing abuse committed by an unauthorized module, by intercepting a document in an HTML scheme, or a component of the document, and falsifying and modifying the document when an Internet browser provides the document to a user. Hereinafter, even though a document in an HTML scheme is described, the document may include another configuration in a format of a language other than HTML. Referring to FIG. 3, operation S201 of substituting a new function for an original function includes operation S301, operation S302, operation S303, and operation S304.

In operation S301, an abuse prevention module may acquire address information of functions associated with a browser object of the Internet browser. For example, the abuse prevention module may acquire a virtual function table including addresses of functions associated with the browser object of the Internet browser. The browser object may include an object based on a component object model (COM) corresponding to a previously built binary form. The COM-based object may be built so as to guarantee the request and use an object in a binary form and to guarantee to reuse the object.

For example, when the Internet browser corresponds to Internet Explorer and the browser object corresponds to an IWebBrowser2 object, a method of preventing browser-based abuse may block the acquisition of an HTML document. The IWebBrowser2 object may correspond to a unique object included in each Internet browser. That is, the IWebBrowser2 object may indicate the Internet browser. In this instance, the IWebBrowser2 object may control the Internet browser, by commanding the Internet browser to navigate to a predetermined webpage. The IWebBrowser2 object may acquire an HTML document of a current webpage and refer to or correct a description of the HTML document.

The IWebBrowser2 object may correspond to an object provided to a browser function extension module stored where the Internet browser is loaded. A browser function extension module having an unauthorized purpose may be provided with the IWebBrowser2 object from the Internet browser, thereby obtaining an HTML document of a current webpage displayed by the Internet browser, to manipulate or falsify an HTML document. The abuse prevention module may prevent the abuse module from acquiring an HTML document through the IWebBrowser2 object.

As another example, when the browser object that the abuse module desires to obtain corresponds to an HTML interface object, the abuse prevention module may block the acquisition of a component of an HTML document. Since the acquisition of a component of an HTML document may not be for an unauthorized purpose, the abuse prevention module may intercept a predetermined function associated with abuse.

For example, by acquiring a search word from a search window of a portal site, a get_value function of an IHTMLInputElement object associated with Internet Explorer may be used for changing a search word input by a user. A getElementByName and getElementsByTagName function of an IHTMLDocument3 object may be used for acquiring a predetermined component of an HTML document and changing a webpage. A get_Images function of the IHTMLDocument3 object may be used for acquiring an image of an HTML document, to change to another image. A type of function acquiring a component of a document used for abuse may not be limited.

In this instance, the COM-based object may have a virtual function table. The virtual function table may include addresses of functions of the browser object. In particular, the virtual function table may store addresses of functions provided by the object to an external location. In this instance, addresses of functions provided by the COM-based object may be stored in the virtual function table, in a predetermined sequence. To request a function of the COM-based object, the browser function extension module may call the function using an address of the function included in the virtual function table.

In operation S302, the abuse prevention module may store and back up an address of the original function, corresponding to a position of the original function. For example, the abuse prevention module may store and back up an address of the original function corresponding to a position of the original function desired to be intercepted, using the virtual function table.

In this instance, the original function may correspond to a function to acquire a document through the Internet browser or a function to acquire a predetermined component of the document. For example, a function to acquire a document may correspond to a get_Document function of the IWebBrowser2 object. The get_Document function may be maliciously used to acquire an HTML document of a current Internet browser. Thus, the method of preventing browser-based abuse may include hooking and intercepting the get_Document function, to prevent a request of the get_Document function.

As an example, the function to acquire a predetermined component of a document may correspond to a get_value function of the IHTMLInputElement object, a getElementByName and getElementsByTagName function of an IHTMLDocument2 object, or a get_Images function of the IHTMLDocument2.

Since the COM-based object may provide functions having a predetermined sequence, the position of the original function in the virtual function table may be determined based on the sequence of the functions. For example, a sequence of functions of the IWebBrowser2 object in the virtual function table may be checked through a program such as an OLEView.

When the address of the original function is checked, the abuse prevention module may separately store and back up an address at the position of the original function on the virtual function table. That is, when the original function is requested by a browser function extension module, the abuse prevention module may not unconditionally block the original function. That is, when the browser function extension module requesting the original function corresponds to an authorized module, the abuse prevention module may separately store the address of the original function.

In operation S303, the abuse prevention module may declare (designate) the new function having the same format, as the original function. In this instance, the new function may correspond to a hook function for intercepting the original function.

In operation S304, the abuse prevention module may record an address of the declared new function at the position of the original function. That is, the abuse prevention module may intercept the original function and record an address of the hook function, at the position of the original function on the virtual function table, thereby causing the browser function extension module to call the hook function, when the browser function extension module calls the original function.

Figure 4:
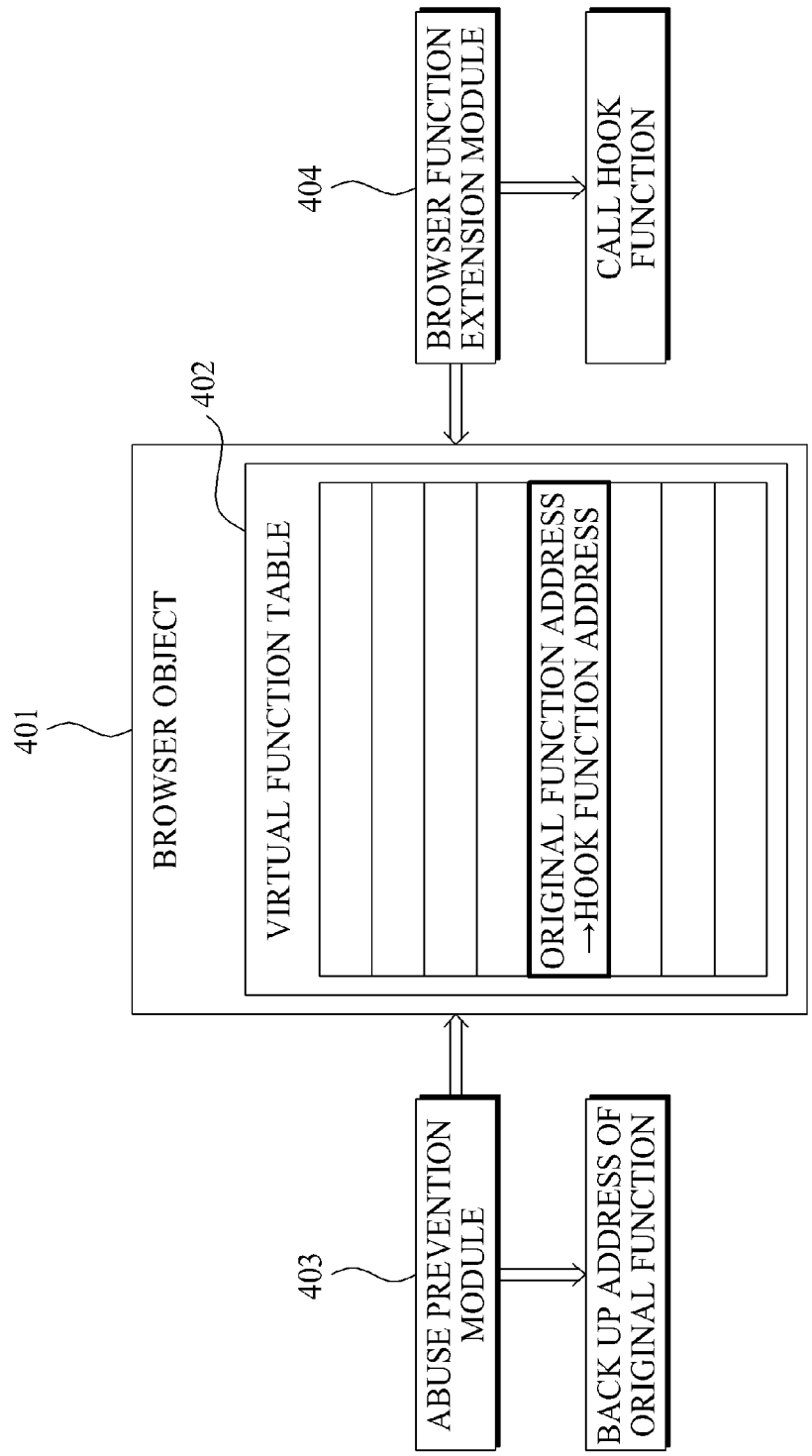
FIG. 4 is a diagram illustrating an operation of preventing abuse with respect to an original function for acquiring a document and/or a component of the document, according to an embodiment of the present invention.

FIG. 4 illustrates a virtual function table 402 corresponding to a browser object 401. In this instance, an abuse prevention module 403 may perform a method of preventing browser-based abuse, according to an embodiment of the present invention. A browser function extension module 404 may denote a different module from the abuse prevention module 403. Here, the abuse prevention module 403 may correspond to a type of module extending a browser function.

The abuse prevention module 403 may acquire address information of functions associated with a browser object of an Internet browser. In this instance, the abuse prevention module 403 may acquire the virtual function table 402, which stores addresses of functions associated with the browser object of an Internet browser. For example, the browser object 401 may correspond to a COM-based object. A sequence of functions on the virtual function table 402 may be fixed with respect to the COM-based object. That is, a position of each function on the virtual function table 402 may be fixed.

The abuse prevention module 403 may search for an address corresponding to a position of the original function, by referencing the virtual function table 402. In this instance, the original function may correspond to a function to be intercepted by the abuse prevention module 403 and may include a function to acquire a document indicated through the Internet browser, or a function to acquire a predetermined component of a document.

The abuse prevention module 403 may store and back up an address of the original function corresponding to a position of the original function. When a normal module calls the original function, the abuse prevention module 403 may request the original function through the backed up address of the original function.

The abuse prevention module 403 may declare a new function having the same format as the original function, and may record an address of the declared new function at a position of the original function in the virtual function table 402. In this instance, the new function may denote a hook function for intercepting the original function.

In conclusion, referring to FIG. 4, the abuse prevention module 403 may substitute an address of the hook function for the address of the original function, at a position of the original function in the virtual function table 402.

Thereafter, the browser function extension module 404 may request the hook function using the address of the hook function recorded at a position of the original function in the virtual function table 402. In this instance, the browser function extension module 404 may intend to request the original function. However, since the hook function is already substituted for the original function by the abuse prevention module 403, the browser function extension module 404 may request the hook function.

The abuse prevention module 403 may check a browser function extension module requesting the hook function. In this instance, when the hook function is requested, the abuse prevention module 403 may check the browser function extension module requesting the hook function, using information of the browser function extension module placed at an address where the hook function returns, in the hook function.

The abuse prevention module 403 may determine whether the module requesting the hook function is a normal module. In this instance, when the module requesting the hook function is included in a white list corresponding to a list of the normal modules used for the Internet browser, the abuse prevention module 403 may designate the module as a normal module.

When the browser function extension module 404 requesting the hook function is a normal module, the abuse prevention module 403 may request the backed up original function. Here, the original function may correspond to a function to acquire a document or a function to acquire a predetermined component of the document, and may denote a function capable of acquiring data of the Internet browser. In contrast, when the browser function extension module 404 requesting the hook function an unauthorized module, the abuse prevention module 403 may block a request with respect to the previously backed up original function. In conclusion, the abuse prevention module 403 may prevent abuse by blocking an access of the unauthorized browser function extension module 404 attempting to call the new function.

Figure 5:
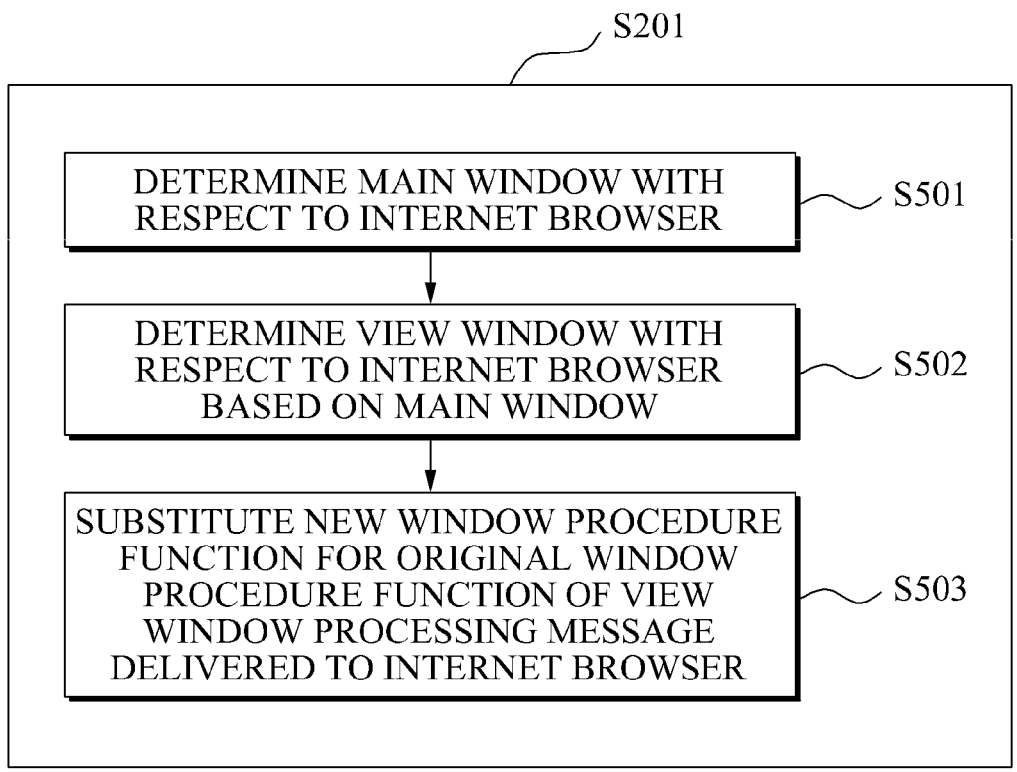
FIG. 5 is a diagram illustrating an operation of substituting an original window procedure function for processing a window message, according to an embodiment of the present invention.

FIG. 5 is a flowchart illustrating an operation of substituting an original window procedure function for processing a window message according to an embodiment of the present invention. When a window message of an object for acquiring a document is transmitted to an Internet browser through a browser function extension module, the Internet browser may provide a currently displayed HTML document (HTML object). That is, a method of preventing browser-based abuse according to FIG. 5 may prevent abuse of acquiring a document through the window message and modifying and changing the document.

Referring to FIG. 5, operation S201, of substituting a new function for an original function, includes operation S501, operation S502, and operation S503. In operation S501, an abuse prevention module may determine a main window with respect to the Internet browser. As an example, the abuse prevention module may determine a main window by requesting a function provided by a browser object of the Internet browser. For example, the abuse prevention module may obtain a handle of a main window of the Internet browser, through an IWebBrowser2 object or API-Hook of a CreateWindowEx function. Here, the browser object may correspond to an object provided to the browser function extension module by the Internet browser, when the Internet browser loads the browser function extension module. The handle of the main window may denote a number for identifying a window.

In operation S502, the abuse prevention module may determine a view window with respect to the Internet browser based on the main window. As an example, the abuse prevention module may determine a view window, with reference to a window structure of the Internet browser. Since the window structure of the Internet browser may have a different form for each version thereof, the abuse prevention module may check a window structure of the Internet browser depending on a particular version thereof.

In this instance, the view window may denote a window that is displayed on the Internet browser. That is, the view window may denote a window that is actually viewed by a user, among windows of the Internet browser.

In operation S503, the abuse prevention module may substitute a new window procedure function for an original window procedure function of the view window, which is processing a message delivered to the Internet browser. For example, the abuse prevention module may substitute a window procedure function through a SetWindowLong function.

As an example, the process of substituting a new window procedure function may include verifying whether the original window procedure function of the view window has been changed, storing and backing up an address of the original window procedure function, when the original window procedure function has not been not changed, and changing the address of the original window procedure function to an address of the new window procedure function.

As an example, the process of verifying whether the original window procedure function of the view window has been changed may be implemented as follows. First, the abuse prevention module may obtain the address of the original window procedure function of the view window. Then, the abuse prevention module may retrieve a location of the browser function extension module, where the corresponding procedure function is placed. In this instance, the abuse prevention module may check a module where the procedure function is stored in a memory.

The abuse prevention module may check the browser function extension module, based on the retrieved location of the browser function extension module. In this instance, when the checked browser function extension module does not correspond to a module associated with the Internet browser, for example, IEFrame.dll, mshtml.dll, and the like are included in Internet Explorer, the abuse prevention module may determine the original window procedure function has been changed by another browser function extension module.

Figure 6:
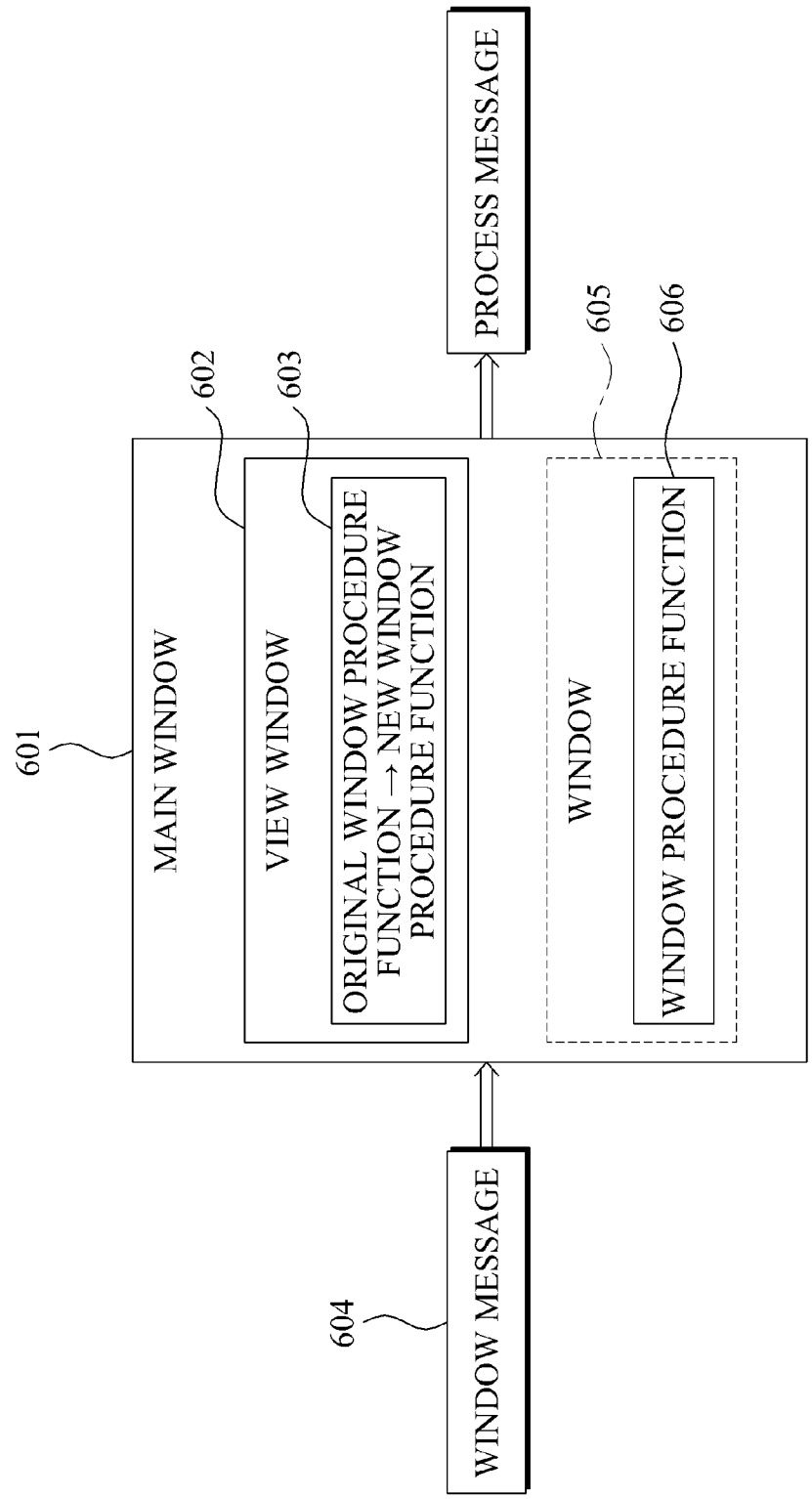
FIG. 6 is a diagram illustrating an operation of preventing abuse with respect to an original function for processing a window message, according to an embodiment of the present invention.

FIG. 6 is a diagram illustrating an operation of preventing abuse, with respect to an original function for processing a window message, according to an embodiment of the present invention. Referring to FIG. 6, an Internet browser may include a window 605 on a main window 601. Here, the window 605 may be plural. A window procedure function 606 may be included in each window 605. A window currently viewed to a user through the Internet browser among the windows 605 may be defined as a view window 602. When a window message 604 is delivered to a window, the window procedure function may be automatically requested, to process the message.

An abuse prevention module may determine a main window with respect to the Internet browser. In this instance, the abuse prevention module may determine the main window using a function provided by a browser object of the Internet browser. The abuse prevention module may determine the view window 602 based on the main window 601. In this instance, the abuse prevention module may determine the view window with reference to a window structure, depending on a version of the Internet browser.

The abuse prevention module may substitute a new window procedure function for an original window procedure function 603 of the view window 602. In this instance, an address of the original window procedure function 603 may be separately stored. That is, when a window message 604 with respect to an object for acquiring a document is delivered to a window, the message may be blocked. Thus, the abuse prevention module may substitute a new window procedure function, capable of hooking the window message 604, for the original window procedure function 603.

In this instance, the abuse prevention module may verify whether the original window procedure function 603 of the view window 602 has been changed, and may store and back up an address of the original window procedure function 603, when the original window procedure function 603 has not been changed. The abuse prevention module may change the address of the original window procedure function 603, to an address of the new window procedure function. Through the aforementioned operation, the abuse prevention module may intercept the original window procedure function 603, before the function 603 is executed.

The Internet browser may process the window message 604 delivered to the Internet browser through the window procedure function. In this instance, when the window message 604 is delivered, the original window procedure function 603 may not be requested, and the substituted new window procedure function may be requested instead.

When the window message 604 occurs, the abuse prevention module may determine whether the window message 604 is a message of an object used for acquiring a document. As an example, the abuse prevention module may include an operation for checking a message value of the window message 604 and an operation of comparing a message value of the window message 604 with the checked message value of the object.

In this instance, since a message of an object for acquiring a document is not a basic message of a window, the abuse prevention module may register and generate the message as a user definition message. When the message has been generated, the abuse prevention module may directly check the message value with respect to the window message 604. When the message has not been generated, the abuse prevention module may generate the message and acquire a message value. For example, the message with respect to an object for acquiring a document may be generated through a RegisterWindowMessage function.

When the window message 604 corresponds to the message of object for acquiring a document, the abuse prevention module may terminate an operation of processing a window message. When a generated window message does not correspond to an object for acquiring a document, the abuse prevention module may request an original window procedure function.

According to another embodiment of the present invention, the invention described with reference to FIG. 3 and FIG. 4 may be applied to key message abuse. That is, an unauthorized browser function extension module may acquire a key message of the Internet browser and intercept a key message. Herein, a key message refers to information such as a search word, identification (ID), and the like input by a user.

To prevent the interception, the abuse prevention module may execute a message hooking operation or control a window procedure through hooking, with respect to a substituted function, thereby preventing the acquisition of a key message. In this instance, the control may be determined based on whether a browser function extension module requesting the corresponding function is included in a list of normal modules.

Figure 7:
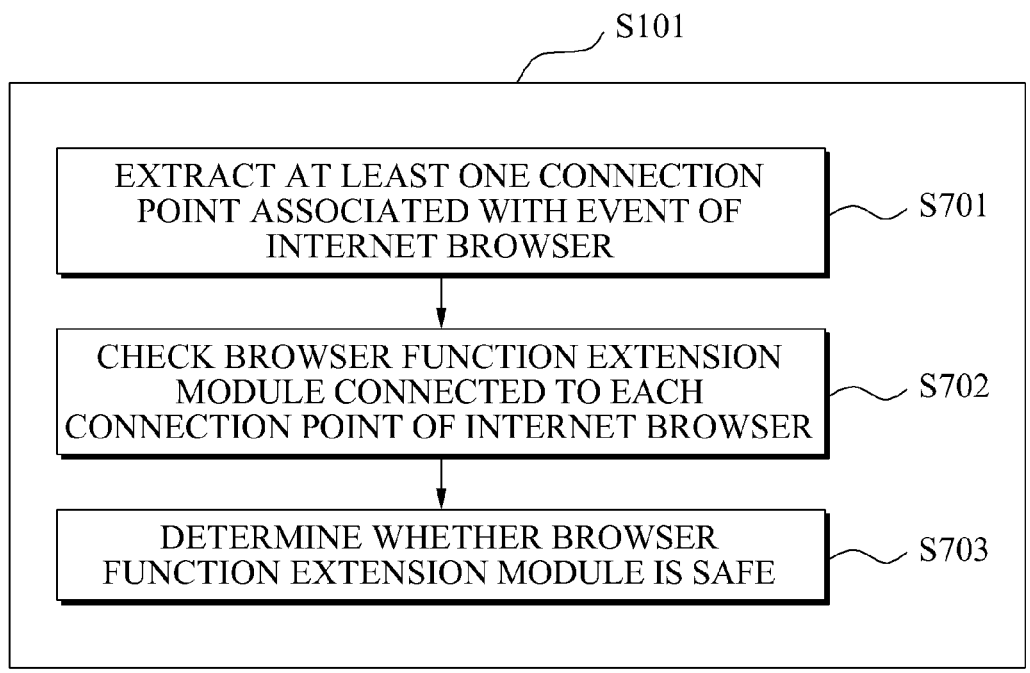
FIG. 7 is a flowchart illustrating an operation of determining whether an access by a browser function extension module through a connection point is an unauthorized access, according to an embodiment of the present invention.

FIG. 7 is a flowchart illustrating an operation of determining whether an access by a browser function extension module through a connection point is an unauthorized access, according to an embodiment of the present invention. Referring to FIG. 7 the method may prevent abuse by blocking a connection of an unauthorized browser function extension module for accessing the Internet browser.

As described above, a browser function extension module may correspond to an add-on program with respect to the Internet browser and thus, may be automatically loaded in response to an execution of the Internet browser. Since the browser function extension module may receive a browser object, for example, an IWebBrowser2 object in the case of Internet Explorer, from the Internet browser, and may manipulate and change an HTML document, the method of preventing browser-based abuse may disable an unauthorized browser function extension module. An as example, an abuse prevention module may periodically retrieve an unauthorized browser function extension module to block a connection.

Referring to FIG. 7, operation S101 includes operation S701, operation S702, and operation S703. In operation S701, the abuse prevention module may extract at least one connection point associated with an operation of the Internet browser, through a browser object of the Internet browser.

In this instance, the connection point refers to a connection between the Internet browser and a browser function extension module. The Internet browser may have a plurality of connection points and may provide different information and operations for each connection point. A connection point container may have a connection point object including a connection point. The connection point object may have an identification (ID) of the connection point object and may verify whether a connection point corresponds to a connection point of an operation, through a comparison with an ID associated with an operation of the Internet browser. Each connection point may include a list of browser function extension modules connected to the connection point.

In operation S702, the abuse prevention module may check a browser function extension module connected to each extracted connection point of the Internet browser. As an example, the abuse prevention module may check a browser function extension module connected to the connection point, by determining a route between the connection point and the browser function extension module, based on an address of the browser function extension module. In particular, the abuse prevention module may use an address of the browser function extension module in a dynamic linking library (DLL) loaded on a memory.

In operation S703, the abuse prevention module may determine whether the checked browser function extension module is an authorized module. As an example, the browser function extension module may determine whether the checked browser function extension module corresponds to an authorized module, based on a list of normal browser function extension modules, for example, a white list, used in the Internet browser. That is, when the checked browser function extension module is included in the white list, the abuse prevention module may determine that the browser function extension module is an authorized module.

When the checked browser function extension module is not included in the white list, the abuse prevention module may determine that the browser function extension module is an unauthorized module. The abuse prevention module may block a connection of an unauthorized module to the Internet browser. As an example, when an unauthorized browser function extension module attempts to connect with the connection point, the abuse prevention module may block the connection using a connection sequence value of the connection point.

Figure 8:
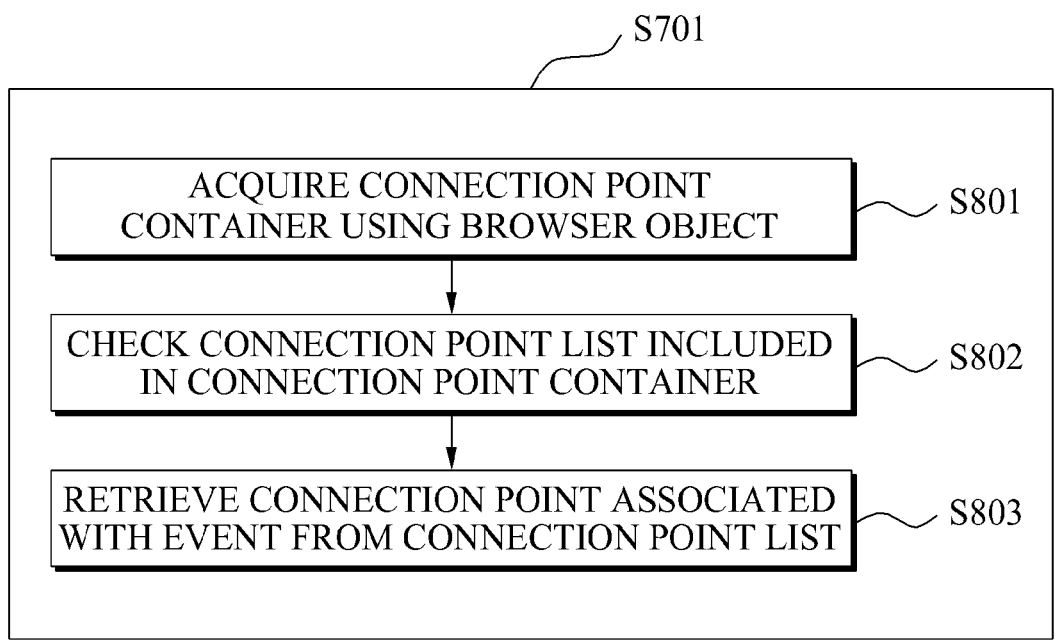
FIG. 8 is a flowchart illustrating an operation of extracting a connection point of an Internet browser, according to an embodiment of the present invention.

FIG. 8 is a flowchart illustrating an operation of extracting a connection point of an Internet browser, according to an embodiment of the present invention. Referring to FIG. 8, operation S701 includes operation S801, operation S802, and operation S803.

In operation S801, the abuse prevention module may acquire a connection point container using the browser object. The connection point container may include connection points associated with the Internet browser. In this instance, the connection point container may include the connection points or may include an object having the connection points. Each connection point of the Internet browser may provide different information and operations. Thus, a browser function extension module should be connected to an appropriate connection point to acquire desired information.

In operation S802, the abuse prevention module may check a connection point list included in the connection point container. As an example, the abuse prevention module may obtain a connection point object, by requesting a function provided by an object of the connection point container. The abuse prevention module may check the connection point list, by requesting a function provided by the connection point object.

In operation S803, the abuse prevention module may retrieve a connection point from the connection point list, by using a connection point ID associated with an operation of the Internet browser. In this instance, the abuse prevention module may retrieve a connection point by comparing a previously known connection point ID with the connection point list. Thus, the abuse prevention module may determine whether browser function extension modules connected to each connection point are authorized and may block the connection of an unauthorized browser function extension module.

Figure 9:
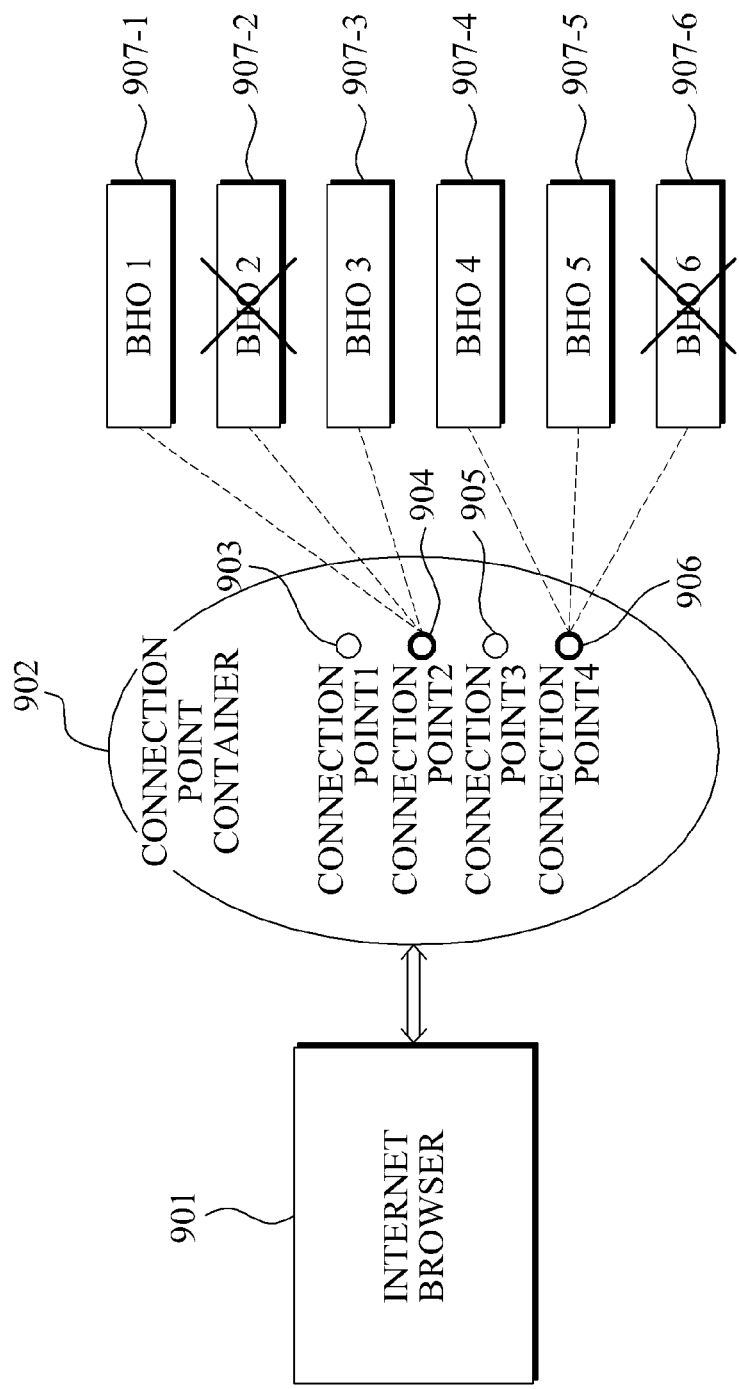
FIG. 9 is a diagram illustrating an operation of preventing abuse through an unauthorized browser function extension module connected to a connection point, according to an embodiment of the present invention.

FIG. 9 is a diagram illustrating an operation of preventing abuse through an unauthorized browser function extension module connected to a connection point, according to an embodiment of the present invention. FIG. 9 illustrates a plurality of browser function extension modules 907-1 through 907-6 connected to an Internet browser 901. An abuse prevention module may be included in a browser function extension module. The abuse prevention module may extract at least one connection point associated with an operation of the Internet browser 901.

As an example, the abuse prevention module may acquire a connection point container 902 using a browser object. The abuse prevention module may check a list of connection points 903 through 906 included in the connection point container 902. Thereafter, the abuse prevention module may retrieve connection points 904 and 906 associated with an operation, from the list of connection points 903 through 906, using a connection point ID associated with an operation of the Internet browser.

Referring to FIG. 9, the abuse prevention module may extract a connection point (2) 904 and a connection point (4) 906 of the Internet browser 901. A connection point container may be determined by the browser object.

The connection point (2) 904 and the connection point (4) 906 may be used to check browser function extension modules connected to them. Then the abuse prevention module may check a list of browser function extension modules connected to the connection point (2) 904 and the connection point (4) 906. In this instance, the list of browser function extension modules may include addresses of the browser function extension modules and connection sequences associated with an operation.

Referring to FIG. 9, a list of browser function extension modules connected to the connection point (2) 904 includes a browser function extension module (1) 907-1, a browser function extension module (2) 907-2, and a browser function extension module (3) 907-3. A list of browser function extension modules connected to the connection point (4) 906 may include a browser function extension module (4) 907-4, a browser function extension module (5) 907-5, and a browser function extension module (6) 907-6.

The abuse prevention module may determine whether each connected browser function extension module is a normal (authorized) module. In this instance, the abuse prevention module may determine whether a browser function extension m is a normal module, based on a list of normal browser function extension modules associated with the Internet browser, which may be referred to as a white list.

When the browser function extension module (2) 907-2 and the browser function extension module (6) 907-6 are determined to be abnormal modules, the abuse prevention module may block the connections of the browser function extension module (2) 907-2 and the browser function extension module (6) 907-6. In this instance, the abuse prevention module may refer to a connection sequence value of the browser function extension module (2) 907-2 and the browser function extension module (6) 907-6. Remaining browser function extension modules 907-1, 907-3, 907-4, and 907-5 may be determined to be normal modules. Thus, the connections thereof may not be blocked by the abuse prevention module. An operation of blocking the connection of unauthorized browser function extension modules may be periodically repeated.

According to another embodiment of the present invention, it may be possible to prevent an unauthorized browser function extension module from transmitting modulated data to the Internet browser. An unauthorized module may transmit modulated data to the Internet browser, by hooking a function associated with transmitting data to the Internet browser, such as a WinInet function provided in a window. In this instance, the abuse prevention module may prevent abuse by verifying whether a function associated with data transmission is modulated and hooked by the unauthorized module.

In particular, the abuse prevention module may verify whether a function is hooked, by verifying whether a CPU jump instruction is input. The input of the CPU jump instructions may be determined by checking an initial portion of a data transmission function. When the data transmission function is modulated and hooked by the unauthorized module, the abuse prevention module may restore the modulated function, by overwriting the modulated portion. Through the restoration operation, a function may be initialized and the abuse prevention module may hook the corresponding function using a function having the same format.

Thereafter, when the browser function extension module requests the function hooked by the abuse prevention module, the abuse prevention module may determine whether the module requesting the function is a normal module. When the module requesting the function is determined to be a normal module, the abuse prevention module may perform a functional request. Otherwise, the abuse prevention module may block a functional request.

Figure 10:
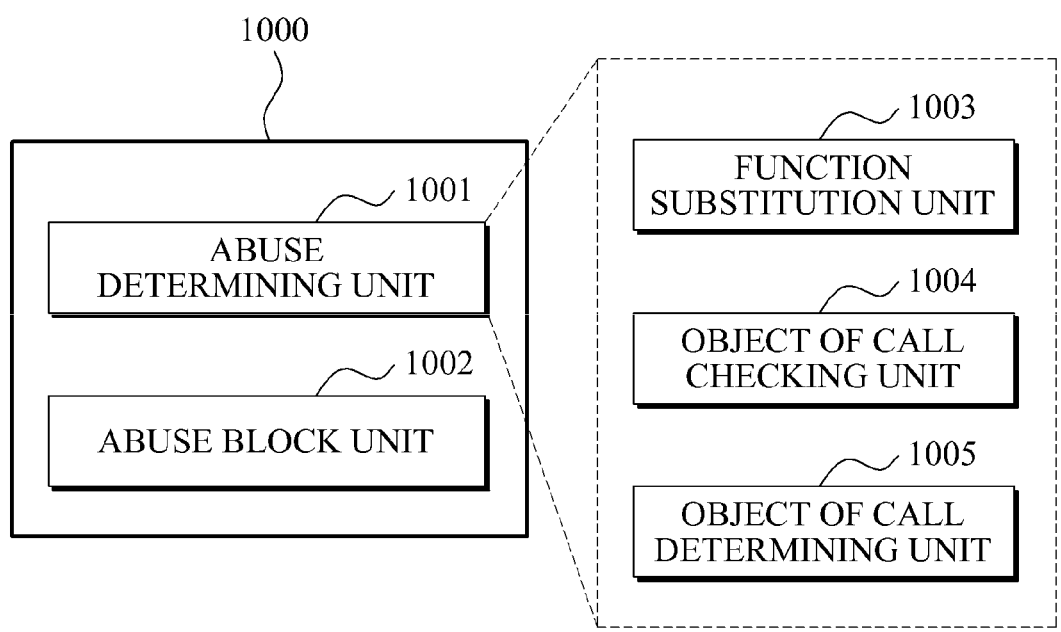
FIG. 10 is a diagram illustrating an overall configuration of a system for preventing browser-based abuse using a function substitution, according to an embodiment of the present invention.

FIG. 10 is a diagram illustrating an overall configuration of a system for preventing browser-based abuse 1000, according to an embodiment of the present invention. Referring to FIG. 10, the system for preventing browser-based abuse 1000 includes an abuse determining unit 1001 and an abuse blocking unit 1002.

The abuse determining unit 1001 may determine whether an access based on a browser function extension module is an unauthorized access for acquiring data of the Internet browser. For example, the access based on a browser function extension module may include an access of the browser function extension module that attempts to control the Internet browser by connecting to the Internet browser. The access may include an attempt by the browser function extension module intending to acquire data of the Internet browser through a functional call or to deliver a message. The access is not limited thereto, however.

The abuse determining unit 1001 may include a function substitution unit 1003, an object of call checking unit 1004, and an object of call determining unit 1005. The browser function extension module may include a BHO connectable to the Internet browser as an add-on, when the Internet browser corresponds to Internet Explorer.

The function substitution unit 1003 may substitute a new function for an original function attempting to acquiring data of the Internet browser. In this instance, the function substitution unit 1003 may prevent an unauthorized browser function extension module from executing the original function, by substituting a hook function for the original function. The function substitution unit 1003 will be further described with reference to FIG. 11 and FIG. 12.

The object of call checking unit 1004 may check an object requesting the new function, when the substituted new function is requested through the browser function extension module. For example, when the browser function extension module calls the hook function, the abuse prevention module may examine the browser function extension module corresponding to an object requesting the new function. For example, the object of call checking unit 1004 may check the browser function extension module requesting the new function, using information of the browser function extension module stored at an address where the new function is to return.

The object of call determining unit 1005 may determine whether the object requesting the new function is authorized. For example, when the browser function extension module is included in a list of normal browser function extension modules used in the Internet browser, the object of call determining unit 1005 may determine that the browser function extension module is an authorized module.

When a browser function extension module is determined to be unauthorized, the abuse blocking unit 1002 may block access requested by the unauthorized browser function extension module. As an example, when the browser function extension module requesting a function corresponds is determined to be an unauthorized module, the abuse blocking unit 1002 may block a request of the original function capable of acquiring data of the Internet browser. That is, the abuse blocking unit 1002 may block a connection of the browser function extension module to the Internet browser, or may blocking an acquisition of data from the Internet browser.

Figure 11:
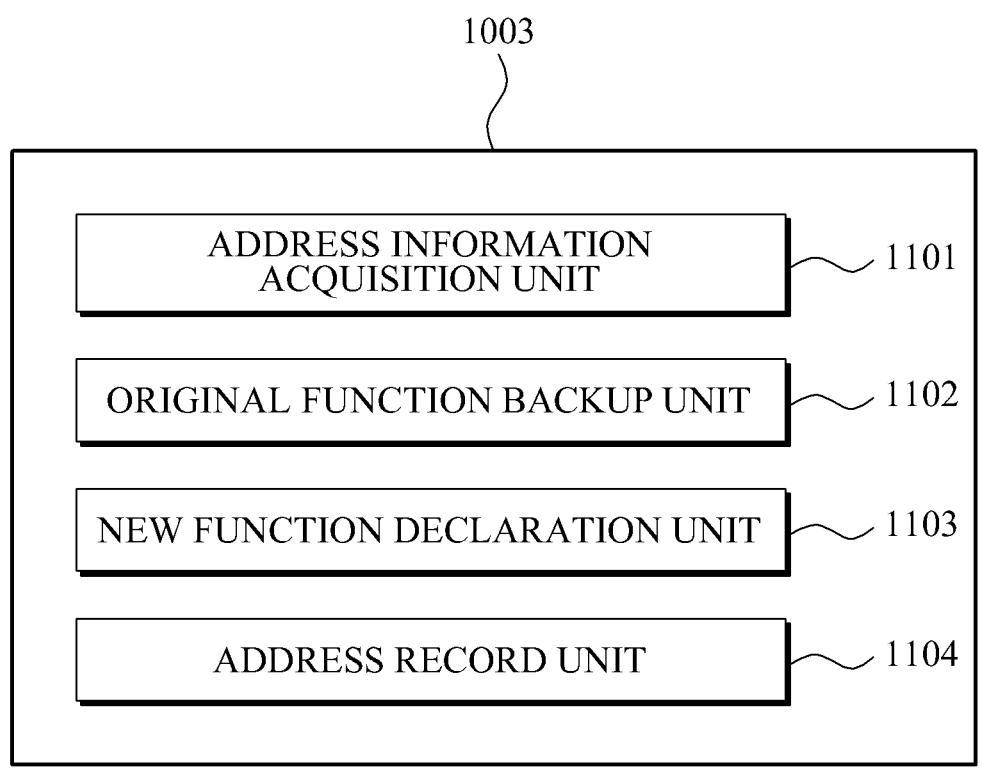
FIG. 11 is a diagram illustrating a further function of a substitution unit that substitutes for an original function to acquire a document or a component of the document, according to an embodiment of the present invention.

FIG. 11 is a diagram illustrating a function substitution unit 1003, according to an embodiment of the present invention. Referring to FIG. 11, the function substitution unit 1003 includes an address information acquisition unit 1101, an original function backup unit 1102, a new function declaration unit 1103, and an address record unit 1104.

The address information acquisition unit 1101 may acquire address information of functions associated with a browser object of an Internet browser. In this instance, the browser object may include an object based on a COM corresponding to a binary form. As an example, the address information acquisition unit 1101 may acquire a virtual function table where addresses associated with the browser object of an Internet browser are stored.

The object based on a COM may include the virtual function table. The virtual function table may store addresses of functions of the browser object, which may be provided from the object to the outside. Addresses of functions provided by the COM-based object may be stored in the virtual function table, in a predetermined sequence. To execute a function of the COM-based object, the browser function extension module may request the function using an address checked through the virtual function table.

The original function backup unit 1102 may store and back up an address of the original function, corresponding to a position of the original function in the address information. As an example, the original function backup unit 1102 may store and back up an address of the original function, corresponding to a position of the original function to be intercepted using the virtual function table. Here, the original function may be a function to acquire a document or a portion thereof, through the Internet browser.

The new function declaration unit 1103 may declare the new function having the same format as the original function. The new function may correspond to a hook function for interception the original function.

The address record unit 1104 may record an address of the declared new function at the position of the original function. The address record unit 1104 may record an address of the hook function at the position of the original function in the virtual function table, thereby causing the browser function extension module to request the hook function, when the browser function extension module requests the original function.

Figure 12:
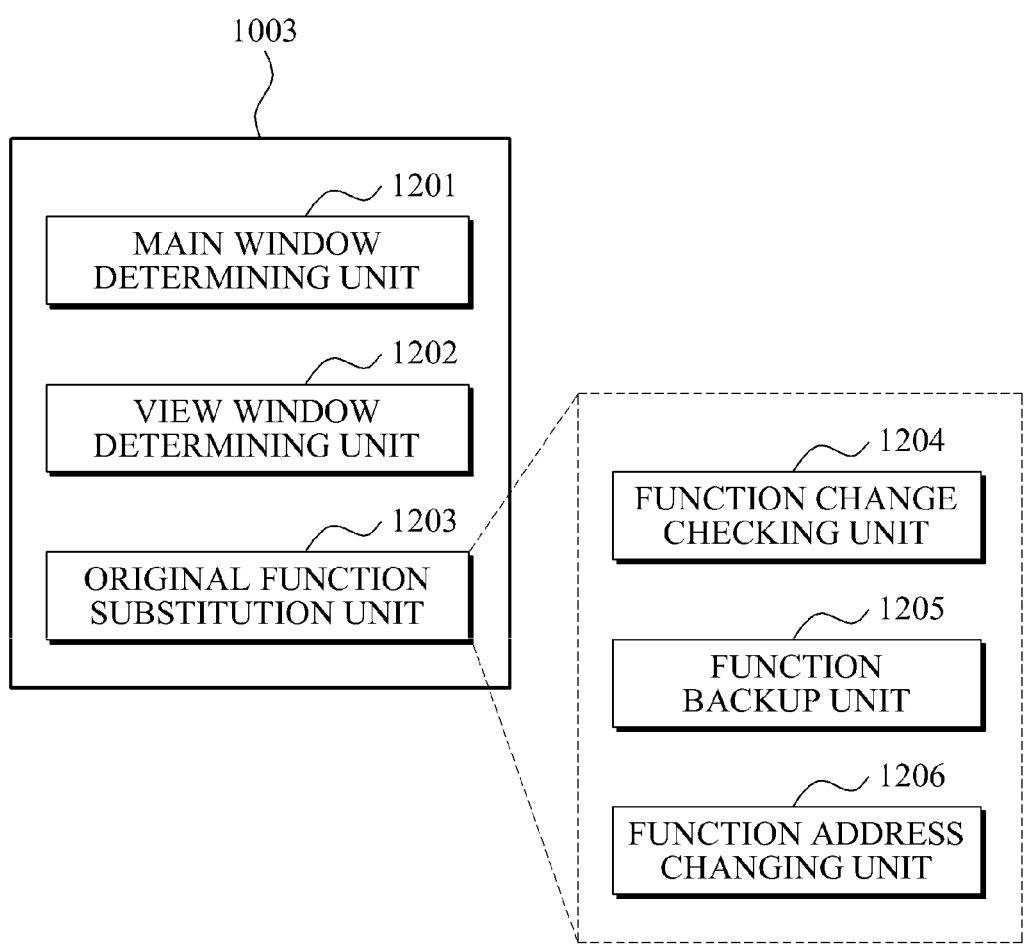
FIG. 12 is a diagram illustrating another substitution unit that substitutes an original function processing a window message, according to an embodiment of the present invention.

FIG. 12 is a diagram illustrating a function substitution unit 1003, according to another embodiment of the present invention. Referring to FIG. 12, the function substitution unit 1003 includes a main window determining unit 1201, a view window determining unit 1202, and an original function substitution unit 1203.

The main window determining unit 1201 may identify a main window of the Internet browser. As an example, the main window determining unit 1201 may identify the main window using a function provided by a browser object of the Internet browser. In this instance, the browser object may be an object provided by the Internet browser to a browser function extension module, when the Internet browser loads the browser function extension module.

The view window determining unit 1202 may identify a view window of the Internet browser, based on the main window. As an example, the view window determining unit 1202 may identify a view window with reference to a window structure, depending on a version of the Internet browser. Since the window structure of the Internet browser may have a different form for each version, the view window determining unit 1202 may check a window structure depending on a particular version. The view window may denote a window at a position where a page is actually viewed on the Internet browser.

The original function substitution unit 1203 may substitute a new window procedure function for an original window procedure function of the view window, when the view window is processing a message delivered to the Internet browser. The object of call checking unit 1004 may check a message using a message value of the message requesting the new window procedure function, when the new window procedure function is requested by the message.

The object of call determining unit 1005 may determine that a message corresponding to an object requesting the new function is authorized, when the message does not correspond to a message for acquiring a document of the Internet browser. The abuse determining unit 1002 may prevent a message from being delivered to the original function, when the message is an unauthorized message for acquiring data of the Internet browser.

Referring to FIG. 12, the original function substitution unit 1203 may include a function change checking unit 1204, a function backup unit 1205, and a function address changing unit 1206. The function change checking unit 1204 may verify whether the original window procedure function of the view window has been changed to another window procedure function.

As an example, the function change checking unit 1204 may obtain an address of the original window procedure function. The function change checking unit 1204 may retrieve a route of a browser function extension module including the corresponding procedure function. In this instance, the function change checking unit 1204 may check a module where the procedure function is stored in a memory.

The function change checking unit 1204 may check the browser function extension module based on the retrieved route of the browser function extension module. In this instance, when the checked browser function extension module does not correspond to a module associated with the Internet browser, for example, IEFrame.dll, mshtml.dll, and the like of Internet Explorer, the function change checking unit 1204 may determine that the original window procedure function has been changed by another browser function extension module.

The function backup unit 1205 may store and back up an address of the original window procedure function of the view window, when the original window procedure function is confirmed to have been unchanged. That is, when a delivered message does not correspond to a message for acquiring a document, the function backup unit 1205 may store and back up the original window procedure function, so as to be able to call the original window procedure function.

The function address changing unit 1206 may change the address of the original window procedure function to an address of the new window procedure function. The function address changing unit 1206 may prevent the original window procedure function from being requested by an unauthorized message, by substituting the new window procedure function for the original window procedure function.

Figure 13:
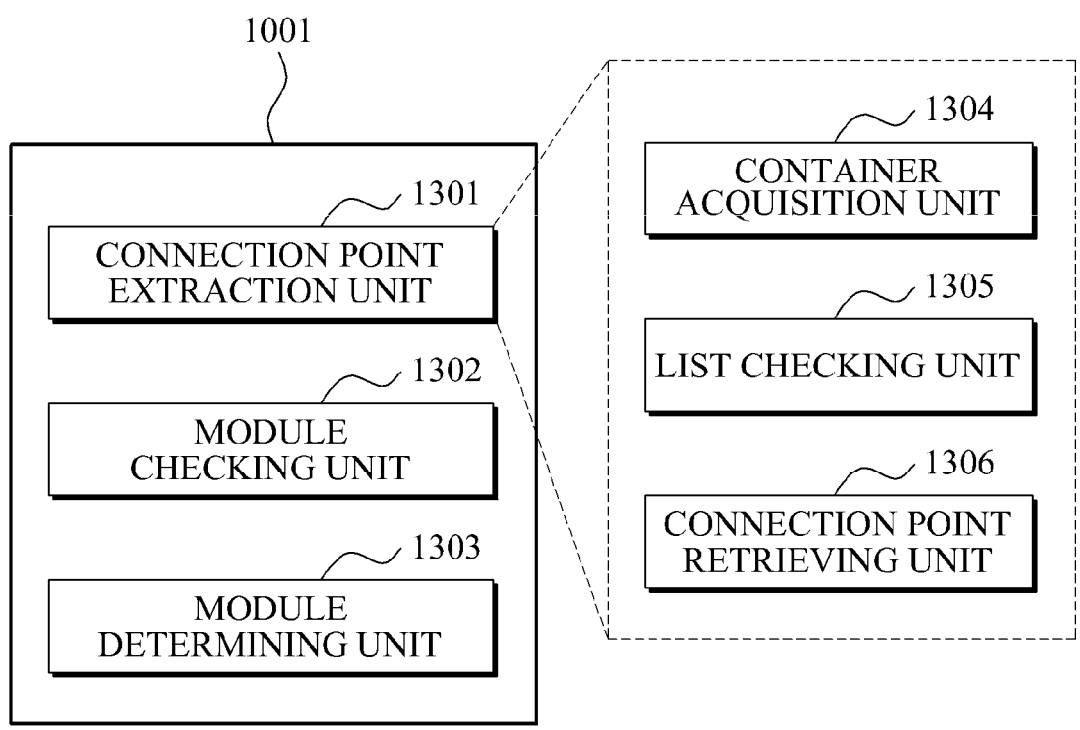
FIG. 13 is a diagram illustrating another function of an abuse determining unit that prevents abuse through a connection point, according to an embodiment of the present invention.

FIG. 13 is a diagram illustrating another abuse determining unit 1001, according to an embodiment of the present invention. Referring to FIG. 13, the abuse determining unit 1001 includes a connection point extraction unit 1301, a module checking unit 1302, and a module determining unit 1303.

The connection point extraction unit 1301 may extract at least one connection point associated with an operation of an Internet browser through a browser object of the Internet browser. The connection point may denote a point of connection between the Internet browser and a browser function extension module. The connection point extraction unit 1301 may include a container acquisition unit 1304, a list checking unit 1305, and a connection point retrieving unit 1306.

The container acquisition unit 1304 may acquire a connection point container using the browser object. The connection point container may include connection points associated with the Internet browser. The connection point container may include an object having the connection points. Each connection point may provide different information and operations.

The list checking unit 1305 may check a connection point list included in the connection point container. The list checking unit 1305 may obtain a connection point object by requesting a function provided by an object of the connection point container. The list checking unit 1305 may check the connection point list by requesting a function of the connection point object.

The connection point retrieving unit 1306 may retrieve a connection point from the connection point list, using a connection point ID associated with the Internet browser. The connection point retrieving unit 1306 may retrieve a connection point by comparing a previously known connection point ID associated with an operation of the Internet browser with the connection point list.

The module checking unit 1302 may check a browser function extension module connected to each extracted connection point of the Internet browser. As an example, the module checking unit 1302 may check a browser function extension module connected to the connection point, by determining a route between the connection point and the browser function extension module, using an address of the browser function extension module.

The module determining unit 1303 may determine whether the checked browser function extension module is authorized. The module determining unit 1303 may determine whether the checked browser function extension module is authorized using a list of normal browser function extension modules used in the Internet browser. The abuse blocking unit 1002 may block a connection of the browser function extension module using a connection sequence value of the connection point, when the browser function extension module connected to the connection point is an unauthorized module.

The description of FIG. 1 through FIG. 9 may be referred to for aspects omitted from the description of FIG. 10 through FIG. 13.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of non-transitory computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of preventing browser-based abuse, the method comprising:

determining whether a browser function extension module is authorized to access data of an Internet browser by intercepting an original function requested by the browser function extension module;

substituting a new function for the original function, the original function being used for acquiring the data of the Internet browser, the substituting including substituting a new window procedure function for an original window procedure function;

checking whether the browser function extension module including the new function is authorized; and preventing the browser function extension module from accessing the data, when the access is determined to be unauthorized.

2. The method of claim 1, wherein the browser function extension module comprises a browser helper object (BHO) connected to the Internet browser.

3. The method of claim 1, wherein the substituting comprises:
acquiring address information of functions associated with a browser object of the Internet browser;
storing and backing up an address of the original function that is stored in a memory at a first location;
declaring the new function having the same format as the original function; and
recording an address of the declared new function at the first location.

4. The method of claim 3, wherein the browser object comprises an object based on a component object model (COM) corresponding to a previously built binary form.

5. The method of claim 3, wherein the original function comprises a function to acquire at least a portion of a document displayed through the Internet browser.

6. The method of claim 3, wherein the checking comprises using information of a browser function extension module stored at an address where the new function returns.

7. The method of claim 3, wherein the checking comprises determining whether the browser function extension module is included in a list of authorized browser function extension modules of the Internet browser.

8. The method of claim 1, wherein the preventing comprises blocking a request to execute the original function.

9. The method of claim 1, wherein the substituting comprises:
identifying a main window of the Internet browser;
identifying a view window of the main window; and
substituting the new window procedure function for the original window procedure function of the view window when the view window processes a message delivered to the Internet browser.

10. The method of claim 9, wherein:
the identifying a main window comprises using a function provided by a browser object of the Internet browser, and
the browser object corresponds to an object provided by the Internet browser to the browser function extension module, when the Internet browser loads the browser function extension module.

11. The method of claim 9, wherein:
the identifying a view window comprises using a window structure corresponding to a version of the Internet browser, and
the view window corresponds to a position where an actual page is viewed with the Internet browser.

12. The method of claim 9, wherein the substituting a new window procedure function comprises:
determining whether the original window procedure function has been changed to another window procedure function;
backing up an address of the original window procedure function, when the original window procedure function is not changed confirmed to be unchanged; and
changing the address of the original window procedure function to an address of the new window procedure function.

13. The method of claim 9, wherein the checking comprises using a message value of the message, when the new window procedure function is requested by the message.

14. The method of claim 9, wherein the checking comprises determining that a message corresponding to an object calling the new window procedure function is authorized, when the message does not request that a browser object acquire a document of the Internet browser.

15. The method of claim 1, wherein the preventing comprises preventing a message from the browser function extension module from being delivered to the original function.

16. A method of preventing browser-based abuse, the method comprising:
extracting one or more connection points between an Internet browser and a browser object of the Internet browser;
identifying a browser function extension module connected to the extracted connection point; and
determining whether the browser function extension module is authorized by,
intercepting an original function requested by the browser function extension module,
substituting a new function for the original function, and
checking whether the browser function extension module including the new function is authorized,
the original function for acquiring the data of the Internet browser, and
the substituting including substituting a new window procedure function for an original window procedure function.

17. The method of claim 16, wherein the extracting comprises:
acquiring a connection point container using the browser object;
checking a connection point list comprised in the connection point container; and
retrieving a connection point from the connection point list, using a connection point identification (ID) associated with an operation of the Internet browser.

18. The method of claim 16, wherein the identifying browser function extension module comprises determining a route between the connection point and the browser function extension module, based on an address of the browser function extension module.

19. The method of claim 16, wherein the determining whether the browser function extension module is authorized comprises using a list of authorized browser function extension modules.

20. The method of claim 16, further comprising blocking a connection of the browser function extension module to the connection point using a connection sequence value of the connection point, when the browser function extension module is not authorized.

21. A non-transitory computer-readable medium comprising an executable program, that when executed by a processor, configures the processor to:
determine whether a browser function extension module is authorized to access data of an Internet browser by intercepting an original function requested by the browser function extension module;
substitute a new function for the original function, the original function being used for acquiring the data of the Internet browser, the substituting including substituting a new window procedure function for an original window procedure function;
check whether the browser function extension module including the new function is authorized; and
prevent the browser function extension module from accessing the data, when the access is determined to be unauthorized.

22. A system of preventing browser-based abuse, the system comprising:
a processor including,
an abuse determining unit configured to determine whether an access request of a browser function extension module is an unauthorized request to acquire data of an Internet browser, the abuse determining unit including a function substitution unit configured to
intercept an original function requested by the browser function extension module,
substitute a new function for the original function, the original function configured to acquire the data of the Internet browser, the substituting including substituting a new window procedure function for an original window procedure function and
check whether the browser function extension module including the new function is authorized; and
an abuse blocking unit stored on a non-transitory computer readable medium and configured to prevent the browser function extension module from acquiring the data, when the access is determined to be unauthorized.

23. The system of claim 22, wherein the abuse determining unit further comprises:
an object of call checking unit to identify an object calling the new function, when the new function is called through the browser function extension module; and
an object of call determining unit to determine whether the object calling the new function is authorized.

24. The system of claim 23, wherein the function substitution unit comprises:
an address information acquisition unit to acquire address information of functions associated with a browser object of the Internet browser;
an original function backup unit to back up an address of the original function corresponding to a position of the original function, based on the address information;
a new function declaration unit to declare the new function having the same format as the original function; and
an address record unit to record the address of the declared new function at the position of the original function.

25. The system of claim 24, wherein the browser object includes an object based on a component object model (COM) corresponding to a previously built binary form.

26. The system of claim 24, wherein the original function corresponds to a function to acquire at least a portion of a document displayed through the Internet browser.

27. The system of claim 24, wherein the object of call checking unit checks a browser function extension module requesting the new function using information of a browser function extension module placed at an address where the new function returns.

28. The system of claim 24, wherein the object of call determining unit determines that a browser function extension module requesting the new function is authorized, when the browser function extension module is included in a list of authorized.

29. The system of claim 23, wherein the abuse blocking unit blocks a request for the original function, when a browser function extension module requesting the new function is unauthorized.

30. The system of claim 23, wherein the function substitution unit comprises:
a main window determining unit to identify a main window of the Internet browser;
a view window determining unit to identify a view window of the main window; and
an original function substitution unit to substitute the new window procedure function for the original window procedure function of the view window, when the view window processes a message delivered to the Internet browser.

31. The system of claim 30, wherein:
the main window determining unit identifies the main window using a function provided by a browser object of the Internet browser, and
the browser object corresponds to an object provided by the Internet browser to a browser function extension module, when the Internet browser loads the browser function extension module.

32. The system of claim 30, wherein:
the main window determining unit identifies the view window using a window structure corresponding to a version of the Internet browser, and
the view window is a window at a position where an actual page is displayed by the Internet browser.

33. The system of claim 30, wherein the original function substitution unit comprises:
a function change checking unit to verify whether the original window procedure function of the view window has been changed to another window procedure function;
a function backup unit to back up an address of the original window procedure function of the view window, when the original window procedure function is confirmed to be unchanged; and
a function address changing unit to change the address of the original window procedure function to an address of the new window procedure function.

34. The system of claim 30, wherein the object of call checking unit identifies a message using a message value of the message calling the new window procedure function, when the new window procedure function is called by the message delivered by the browser function extension module.

35. The system of claim 30, wherein the object of call determining unit determines that a message corresponding to an object calling the new window procedure function is authorized, when the message does not correspond to a message of a browser object to acquire a document of the Internet browser.

36. The system of claim 23, wherein the abuse blocking unit prevents a message requesting the new function from being delivered to the original function, when the message requests unauthorized access to data of the Internet browser.

37. The system of claim 22, wherein the browser function extension module corresponds to a browser helper object (BHO) connectable to the Internet browser as an add-on.

38. The system of claim 22, wherein the abuse determining unit comprises:
a connection point extraction unit to extract at least one connection point between the Internet browser and an extension module;
a module checking unit to identify a browser function extension module connected to the extracted connection point; and
a module determining unit to determine whether the identified browser function extension module is authorized.

39. The system of claim 38, wherein the connection point extraction unit comprises:
a container acquisition unit to acquire a connection point container using a browser object;
a list checking unit to check a connection point list included in the connection point container; and
a connection point retrieving unit to retrieve a connection point associated with an event from the connection point list, using a connection point identification (ID) associated with the Internet browser.

40. The system of claim 38, wherein the module checking unit identifies a route between the connection point and the browser function extension module, based on an address of the browser function extension module.

41. The system of claim 38, wherein the module determining unit determines whether the browser function extension module is authorized, using a list of authorized browser function extension modules.

42. The system of claim 38, wherein the abuse blocking unit blocks a connection of the identified browser function extension module to the connection point, with reference to a connection sequence value of the connection point, when the identified browser function extension module is not authorized.

\* \* \* \* \*